US010362035B1

(12) United States Patent
Corbett

(10) Patent No.: US 10,362,035 B1
(45) Date of Patent: Jul. 23, 2019

(54) SECURED COMMUNICATIONS USING AVIONICS POWER BUS NETWORK

(71) Applicant: Rockwell Collins, Inc., Cedar Rapids, IA (US)

(72) Inventor: Matthew P. Corbett, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 29 days.

(21) Appl. No.: 15/217,712

(22) Filed: Jul. 22, 2016

(51) Int. Cl.
| | |
|---|---|
| H04L 29/06 | (2006.01) |
| H04B 3/54 | (2006.01) |
| H04L 12/66 | (2006.01) |
| H04L 12/40 | (2006.01) |
| H04L 29/08 | (2006.01) |

(52) U.S. Cl.
CPC ............ H04L 63/10 (2013.01); H04B 3/54 (2013.01); H04L 12/40 (2013.01); H04L 12/66 (2013.01); H04L 67/12 (2013.01); H04L 2012/4028 (2013.01)

(58) Field of Classification Search
CPC ...... H04L 671/025; H04L 12/40; H04B 3/548
USPC .......................................................... 726/7
See application file for complete search history.

(56) References Cited

U.S. PATENT DOCUMENTS

| | | | | |
|---|---|---|---|---|
| 4,264,827 A * | 4/1981 | Herzog | .................. | H04L 12/40 307/17 |
| 5,081,648 A * | 1/1992 | Herzog | ................. | H04L 5/1423 178/69 C |
| 6,112,275 A * | 8/2000 | Curry | ..................... | G01K 1/028 711/100 |
| 8,537,727 B2 * | 9/2013 | Guillot | ..................... | H04B 3/54 340/538 |
| 9,273,981 B1 * | 3/2016 | Downey | ............... | B64C 39/024 |
| 2004/0258141 A1 * | 12/2004 | Tustison | ............... | H04B 3/548 375/219 |
| 2005/0228559 A1 * | 10/2005 | Bloch | .................... | G07C 5/008 701/3 |
| 2008/0052505 A1 * | 2/2008 | Theobald | ............... | H04L 12/12 713/1 |

(Continued)

FOREIGN PATENT DOCUMENTS

WO WO-2015172857 A1 * 11/2015 ............... H02J 3/14

Primary Examiner — Bryan F Wright
(74) Attorney, Agent, or Firm — Donna P. Suchy; Daniel M. Barbieri

(57) ABSTRACT

Embodiments of the inventive concepts disclosed herein are directed to systems and methods for providing secured communications via an avionics power bus network. The power bus network can have a plurality of power bus domains, for providing power to at least two endpoint systems. The avionics power bus network can incorporate a plurality of network access interfaces, and each of the network access interfaces may provide power bus isolation between at least two of the power bus domains, and/or network communications isolation across at least two power bus domains. A network gateway may configure communications between the two endpoint systems through one or more of the network access interfaces, and for validating credentials to permit the communications to be transmitted through some of the power bus domains. The network gateway can be accessed via a network access point to configure the communications.

18 Claims, 9 Drawing Sheets

(56) References Cited

U.S. PATENT DOCUMENTS

2008/0119968 A1* 5/2008 Loda .................... H04L 67/025
                                                        701/3
2013/0128392 A1* 5/2013 Maglaque .............. H02H 7/261
                                                        361/1

* cited by examiner

SECURED COMMUNICATIONS USING AVIONICS POWER BUS NETWORK

BACKGROUND

Communication between systems within an aircraft is essential to safe operation in the aircraft. When a primary interconnect bus or wireless connection of one system becomes unreliable or unusable, communication with that aircraft system becomes compromised. Conventional communications systems typically involve the use of equipment, such as physical cables or wiring, that add weight to an aircraft, or occupy space in the aircraft, or both. Adding a wireless system for example, to provide a secondary or back-up communications means would also introduce additional equipment and weight. Thus, the limitations of such communications systems provide a disincentive, rather than a solution, for establishing a secondary or back-up avionics communications infrastructure. Overcoming such limitations would improve aircraft safety by providing an alternate communications network between systems operating on an aircraft.

An interconnect that avionics systems on an aircraft commonly have is a connection to the aircraft power. An aircraft's power bus network is used to provide primary power to different systems on the aircraft, and hence the power bus network is connected to practically all of the aircraft's systems that consume power.

SUMMARY

In one aspect, embodiments of the inventive concepts disclosed herein are directed to a system for providing secured communications via an avionics power bus network. The system can include an avionics power bus network having a plurality of power bus domains, for providing power to at least one endpoint system and another endpoint system connected to the avionics power bus network. The avionics power bus network can incorporate a plurality of network access interfaces. Each of the plurality of network access interfaces may be configured to provide power bus isolation between at least two of the power bus domains, and/or network communications isolation across the at least two power bus domains. The system can include a network gateway for configuring communications between the first endpoint system and the second endpoint system through one or more of the plurality of network access interfaces, and for validating credentials to permit the communications to be transmitted through a first subset of the plurality of power bus domains. The system can further include a network access point for accessing the network gateway to configure the communications, and to provide the credentials to the network gateway.

In some embodiments, and in accordance with the inventive concepts disclosed herein, the network access point is connected to the first endpoint system. The credentials may be provided by the first endpoint system to the network gateway via the network access point. In certain embodiments, the network access point is connected to an access terminal and the credentials are provided by the access terminal to the network gateway via the network access point. The plurality of power bus domains can include another subset of power bus domains that requires another set of credentials different from the provided credentials.

In some embodiments, and in accordance with the inventive concepts disclosed herein, a subset of the network access interfaces may each execute a transactions program. The transactions program can allow or deny a communication to pass through corresponding network access interfaces according to the provided credentials. Some of the network access interfaces may each include a circuit breaker for providing physical isolation or physical connection between two corresponding power bus domains according to the provided credentials. Some of the network access interfaces may each incorporate or correspond to a switch or router for network communications. Some of the network access interfaces may each provide a network translation layer between at least two power bus domains.

In a further aspect, embodiments of the inventive concepts disclosed herein are directed to a method for providing secured communications via an avionics power bus network. The method may include connecting a network gateway to an access terminal via a network access point of an avionics power bus network. The avionics power bus network may have a plurality of power bus domains, for providing power to at least one endpoint system and a second endpoint system connected to the avionics power bus network. The network gateway may receive from the access terminal via the network access point, a request to configure communications between the first endpoint system and the second endpoint system through one or more of a plurality of network access interfaces incorporated into the avionics power bus network. The network gateway may receive, from the access terminal, credentials to be validated for permitting the communications to be transmitted through a first subset of the plurality of power bus domains. Each of the plurality of network access interfaces may provide power bus isolation between at least two of the plurality of power bus domains, and network communications isolation across the at least two of the plurality of power bus domains. The network gateway may validate the credentials received from the access terminal. The network gateway may configure, responsive to the request and the validated credentials, the communications between the first endpoint system and the second endpoint system through the one or more of the plurality of network access interfaces and the first subset of the plurality of power bus domains.

In some embodiments, and in accordance with the inventive concepts disclosed herein, the access terminal include the first endpoint system and the credentials are provided by the first endpoint system to the network gateway via the network access point. The network gateway may receive from the access terminal via the network access point, another request to configure communications between another pair of endpoint systems through the avionics power bus network, and another set of credentials to be validated for permitting the communications to be transmitted through a second subset of the power bus domains. The network gateway may configure, according to the provided credentials, some of the network access interfaces to each allow or deny, via a transactions program executing on the respective network access interface, a communication to pass. The network gateway may configure, according to the provided credentials, at least a subset of the network access interfaces to each provide physical isolation or physical connection via a circuit breaker between two corresponding power bus domains. A subset of the network access interfaces may each include or correspond to a switch or router for network communications. Some of the network access interfaces may each provide a network translation layer between at least two power bus domains.

In yet another aspect, embodiments of the inventive concepts disclosed herein are directed to an avionics power bus network for secured communications. The avionics power bus network may include a plurality of power bus domains for providing power to at least a first endpoint system and a second endpoint system. A plurality of network access interfaces may each provide power bus isolation between at least two of the plurality of power bus domains, and network communications isolation across at least two of the plurality of power bus domains. A network gateway may configure communications between the first endpoint system and the second endpoint system through one or more of the plurality of network access interfaces, and may validate credentials to permit the communications to be transmitted through a first subset of the plurality of power bus domains. A network access point may provide access to the network gateway to configure the communications, and to provide the credentials to the network gateway.

In some embodiments, and in accordance with the inventive concepts disclosed herein, the network access point is connected to the first endpoint system and the credentials are provided by the first endpoint system to the network gateway via the network access point. In certain embodiments, the network access point is connected to an access terminal and the credentials are provided by the access terminal to the network gateway via the network access point. The plurality of power bus domains may include a second subset of power bus domains that operates with a second set of credentials different from the provided credentials. A subset of the network access interfaces may each execute a transactions program. The transactions program may allow or deny a communication to pass through corresponding network access interfaces according to the provided credentials. A subset of the network access interfaces may each include a circuit breaker to provide physical isolation or physical connection between two corresponding power bus domains according to the provided credentials.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
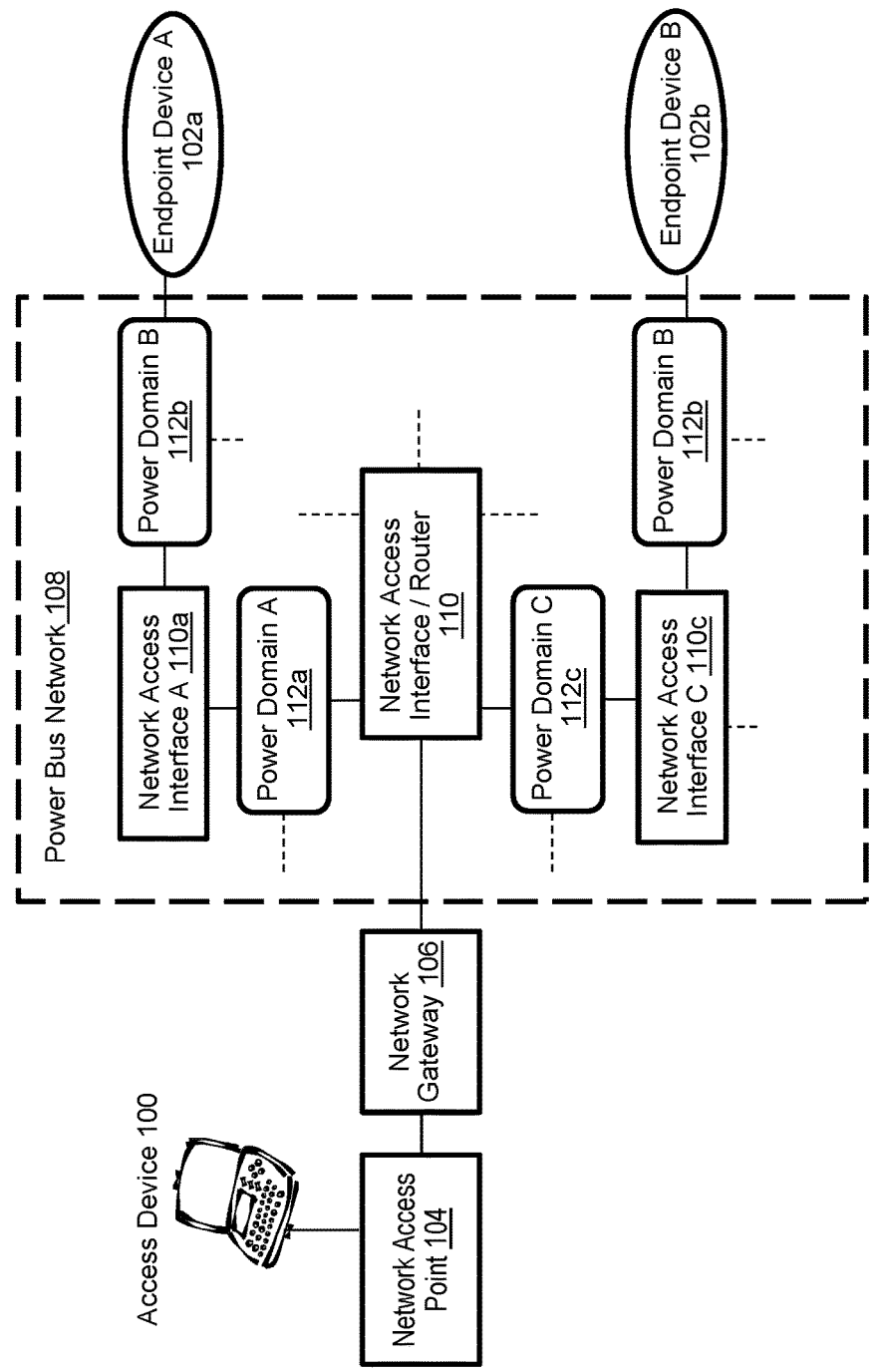
FIG. 1 is a block diagram of an example embodiment of a system for providing secured communications via an avionics power bus network in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the schematic diagrams, but should be construed in accordance with the language in the claims.

In some aspects, embodiments of the inventive concepts disclosed herein are directed to an avionics system for secured communications. An aircraft's power bus network is used to provide primary power to different systems on the aircraft, and hence the power bus network is connected to practically all of the aircraft's units or systems that consume power. In accordance with the inventive concepts disclosed herein, this power bus network can be used as a backbone to establish a communications network throughout the aircraft. Enabling the aircraft power bus network for in-aircraft communications, in addition to power distribution, introduces an additional or alternate communications interconnect that leverages existing aircraft infrastructure, e.g., without introducing significant weight to an aircraft or requiring significantly additional space for communications equipment. Since the aircraft power bus network is connected to critical systems in certain power bus domains, the present disclosure includes aspects on protecting or securing such domains and critical systems, via the use of various network access interfaces, and by configuring communications between endpoint systems for example. An endpoint device or system can include any electrically powered device, system or module connected to the power bus network for power, for example, an aircraft engine, landing gear system, navigational system, or inflight entertainment content server. Another endpoint device, either operated by a person or executing a program, may seek to connect to any one or more of these endpoint systems to obtain status data, perform diagnostics, or perform software updates, for example.

Referring to FIG. 1, one example embodiment of an avionics system for providing secured communications is depicted. The system includes a network access point 104, a network gateway 106, and a power bus network 108. The power bus network 108 may incorporate one or more network access interfaces 110 and one or more power domains 112 that can be used to support communications between an endpoint device A 102a and an endpoint device B 102b for instance. Each of the above-mentioned elements or entities (and others disclosed herein) is implemented in hardware, or a combination of hardware and software. For instance, each of these elements or entities can include any application, program, library, script, task, service, process or any type and form of executable instructions executing on hardware of the system. The hardware includes circuitry such as one or more processors, memory devices, connections or bus structures, and/or communication interfaces, in one or more embodiments.

Although this disclosure may refer to systems and components in an avionics or aircraft context, this is merely by way of illustration and does not limit the inventive concepts in any way. For example, the power bus network or interconnect of a water vessel or other transport vehicle or craft, or of a building or a geographical area, can similarly be used to provide secure communications between devices or subsystems.

In some embodiments, the power bus network 108 includes a power interconnect or power distribution network that provides, conveys or distributes power to one or more endpoint devices or subsystems, within an aircraft for example. For instance, the power bus network 108 may include one or more physical power buses or connections that provide primary power and/or secondary power to at least one subsystem. A low energy signal could be transmitted on the power bus effectively transforming the power bus into a communications link between different subsystems tapping into the power bus. This transmission of the low energy signal would not interfere with the power bus' existing function of providing power to the subsystems. The low energy signal would be capable of achieving data rates (e.g., near or at Gigabit/sec rates) that would make such transmissions applicable to many communication functions, e.g., transmission of avionics diagnostic instructions and results, transfer of inflight entertainment content, or transmission of remote sensor data. A power system (including a power bus network) of an aircraft for instance, can serve as a backbone to create a power bus network architecture. One or more equipment or power system components may be modified or reconfigured to support networking communications over power bus wiring.

Figure 2:
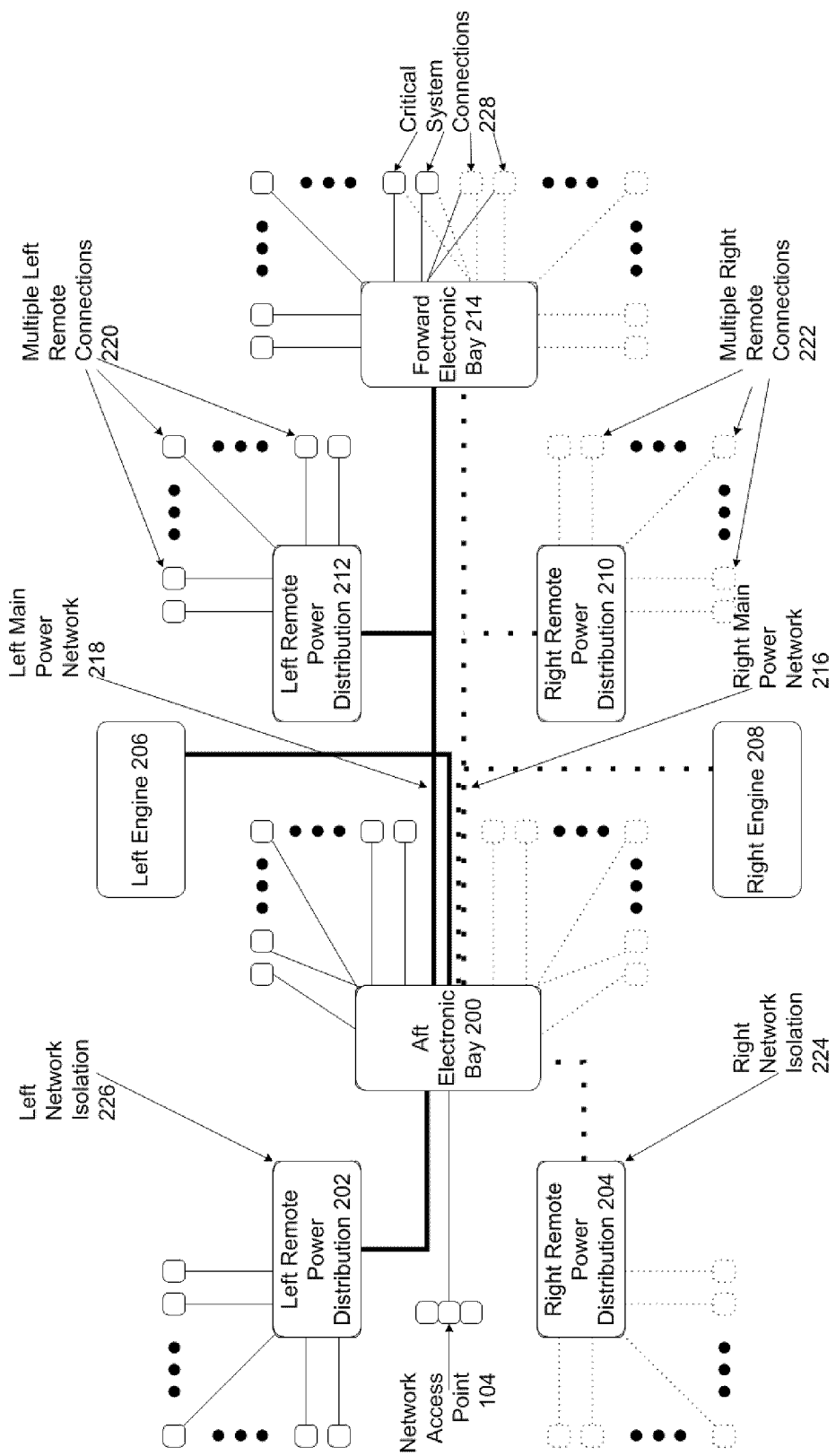
FIG. 2 shows a block diagram of another example embodiment of a system for providing secured communications via an avionics power bus network in accordance with some embodiments of the inventive concepts disclosed herein.

FIG. 2, for example, depicts an embodiment of an avionics system for secured communications FIG. 2 shows a network access point 104 that can be used to establish communications using an aircraft's power system. For instance, the aircraft's power system may include an aft electronic bay. The aft electronic bay may provide a first level of redundant power distribution to left and right main power networks (e.g., 216, 218) on the aircraft, to other electronic bays (e.g., forward electronic bay 214), and/or to remote power distribution equipment (e.g., 202, 204, 210, 212). In addition, the aft electronic bay may provide power to aircraft connected electronic equipment in the middle of the aircraft's airframe. In the power bus network, the aft electronic bay may additionally provide network switching and/or routing functions to communicate with downstream connection points to enable or inhibit communication. For example, the aft electronic bay may include a network gateway 106 and/or a network access router 110 (sometimes referred as a network router). In some embodiments, the fore electronic bay can similarly provide network switching and/or routing functions to communicate with downstream connections. The fore electronic bay can provide redundant or additional power distribution to aircraft electronic equipment in the forward section of the airframe for example.

In some embodiments, the network access point 104 provides or includes an interface for accessing the power bus network 108. The network access point 104 can support any type of external connection, for example and not limited to Ethernet, Wi-Fi, and/or Cellular. The network access point 104 can have multiple communications interfaces to communicatively connect with one or more types of access devices 100 (e.g., a laptop, a tablet, a smart phone device). In some embodiments, the network access point 104 incorporates a device that can communicate via one or more communications protocols with access device(s) 100. The network access point 104 may translate one or more messages or instructions from the access device 100, to a form or a communications protocol (e.g., IEEE 802.3, or ARINC 664) supported by the power bus network 108 and/or the network gateway 106. The network access point 104 may provide the access device 100 access to the network gateway 106. In certain embodiments, the system can include multiple network access points 104, for example located at multiple locations (e.g., secured locations) on an aircraft. In some embodiments, the network access point 104 and/or the network gateway 106 may authenticate an access device 100 connecting to the network access point 104 or sending a message through the network access point 104.

In some embodiments, the network gateway 106 provides a gateway or interface to access the power bus network 106 and/or access information about the power bus network 106. The network gateway 106 may provide authentication services to validate credentials provided by the access device 100 from the network access point 104, and determine whether to deny or grant access to the power bus network 106. A user may use an access device 100 or terminal to access the network gateway 106 to configure communications between two endpoint devices 102 using the power bus network 108. In some embodiments, the access device 100 is (or includes) one of the endpoint devices 102 seeking to connect with the other endpoint device 102 via the power bus network 108. The access device 100 may request or instruct the network gateway 106 to configure communications between two endpoint devices 102. The access device 100 may provide credentials and information to the network gateway 106 to authenticate the access device 100, and/or to authenticate the end point device(s) 102 for communications using the power bus network 108. The credentials and information may include any type or form of login information, certificate, encryption key information, biometrics, password/passcode, captcha response, addresses (e.g., device IP addresses associated with the endpoint devices), identification (e.g., user name/identifier, MAC address, or device identifier, associated with the user and/or endpoint devices), for example. The network gateway 106 may determine whether the end point devices 102 are authorized based on the provided credentials to communicate with each other, and/or authorized to access one or more power domains 112 of the power bus network 108. The network gateway 106 may determine power domains 112 that a particular transaction of the endpoint devices is authorized to use for communication.

The network gateway 106 may provide a network management function to allow for configuration of various network switches and/or routers, etc. The network gateway 106 may determine the locations where the endpoint devices connect to the power bus network 108, and may determine if one or more communication paths are possible between these locations according to the power domains that the endpoint devices (or corresponding transactions) are authorized to access. The network gateway 106 may determine or identify one or more communications paths (using one or more power domains 112 and/or network access interfaces 110) via the power bus network 108, for the endpoint devices (or for the corresponding transactions), according to the provided credentials for instance.

The network access interfaces 110 of the power bus network 108 may include a network router. The network router may provide a network translation layer between different network domains of the aircraft for instance. These network domains can be between switches or other systems. For example, the network router may translate between one or more of: different voltages, current levels, communications protocols and/or frequencies, packet sizes, data rates, packet priority levels, network stack layers for packet processing and/or transmission, etc. The network router may be configured and/or administered through the network gateway 106.

Figure 3:
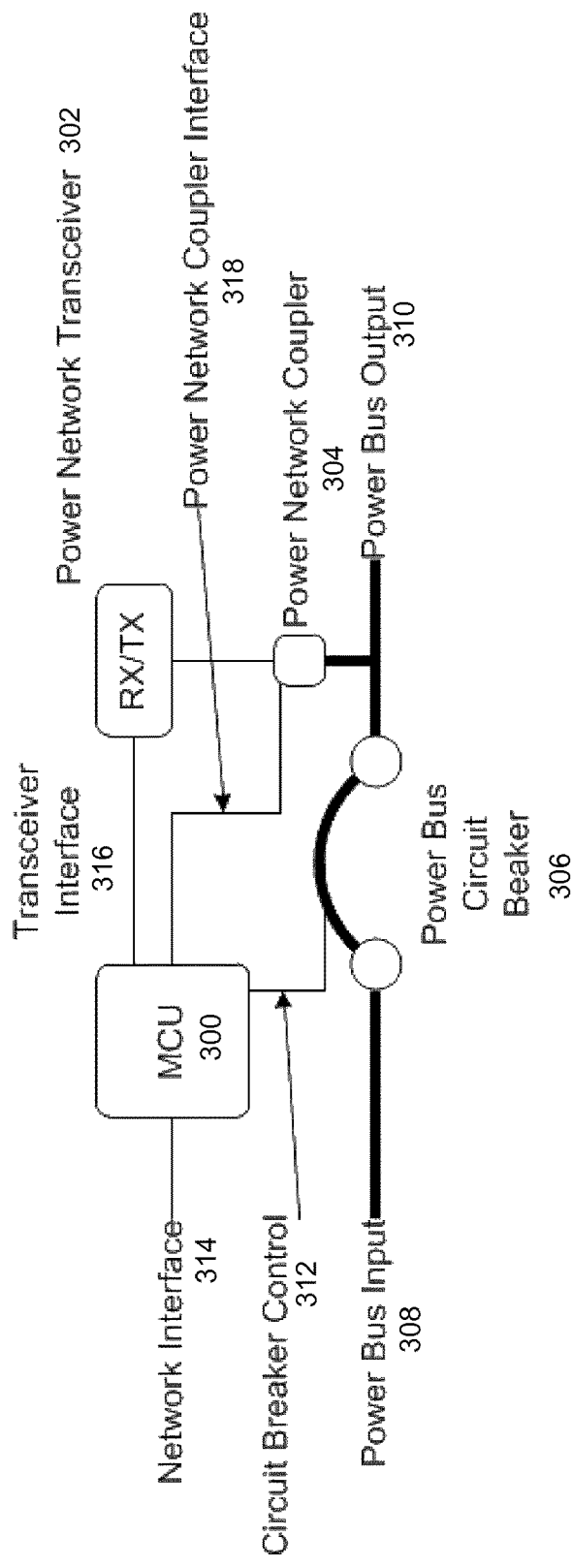
FIG. 3 shows a block diagram of an example embodiment of a network access interface of a system for providing secured communications via an avionics power bus network in accordance with some embodiments of the inventive concepts disclosed herein.

In some embodiments, some of the network access interfaces 110 may correspond to an Electronic Circuit Breaker and Power Network Access component 110, and these terms may be used interchangeably in this disclosure. FIG. 3 depicts an example embodiment of a network access interface 110 of a system for providing secured communications via an avionics power bus network. The Electronic Circuit Breaker and Power Network Access component 110 can provide a network interface 314 connection with some portion of the power bus network 108 (e.g., one or more power domains) in order to leverage the connection to achieve communication with the other subsystems connected to the power bus network 108. This component may include a MicroController Unit (MCU) 300 to provide interface translation, virtual network isolation, power system control functions for breakers, etc. This component may include a Power Network Transceiver 302 which provides the physical translation to the power bus. This component may include a Power Network Coupler 304 and/or Power Network Coupler Interface 318 that can provide isolation and protection between different power domains as well as provide physical isolation for network communications.

The Electronic Circuit Breaker and Power Network Access component may include a transaction agent executing on the MCU 300 for instance, that provides virtual isolation for network communications. The transaction agent may function as a gatekeeper or as access control, and may not allow specific transactions across the network. The transaction agent may determine whether to deny or grant access through the component, for example through inspection of MAC address and/or IP Address in a packet, or using proprietary means in order to achieve a secure network. The transaction agent may determine whether to deny or grant access to a packet based on configuration by the network gateway 106, for instance. For example, the network gateway may update the packet (or separately send instructions) to include information and/or credentials for the packet to traverse particular network access interfaces 110 and/or power domains 112. The MCU 300 may be coupled via a Transceiver Interface 316 to a Power Network Transceiver 302 that receives packets from the power bus network 108 and transmits packets to the power bus network 108.

In some embodiments, physical isolation of power and/or network communication is achieved through control of the MCU, via a circuit breaker control 312 for example. The MCU may disconnect all network communication on the power bus using a power bus circuit breaker 306, located between a power bus input 308 and a power bus output 310 for example. Such circuit breaker physical isolation can provide a mechanism to ensure that power network communications cannot be supported by a corresponding power bus, allowing for a safe and secure means to for example connect cabinet domain devices (e.g., passenger cabin devices) to the power network and not allow the cabinet domain devices to communicate with the underlying aircraft network domains.

The network access interfaces 110 (or Electronic Circuit Breaker and Power Network Access components) may reside at various locations in the power bus network 108. For example and referring to FIG. 4, an example embodiment of an aft electronic bay 200 of an avionics power bus network for providing secure communications is depicted. Referring to FIG. 5, an example embodiment of a fore electronic bay 214 of an avionics power bus network for providing secure communications is depicted. And referring to FIG. 6, an example embodiment of a remote power distribution (e.g., 202, 204, 210, or 212) portion of an avionics power bus network for providing secure communications is depicted. Each of the aft electronic bay 200, the fore electronic bay 214, and the remote power distribution portion can include one or more Electronic Circuit Breaker and Power Network Access components 110.

Figure 4:
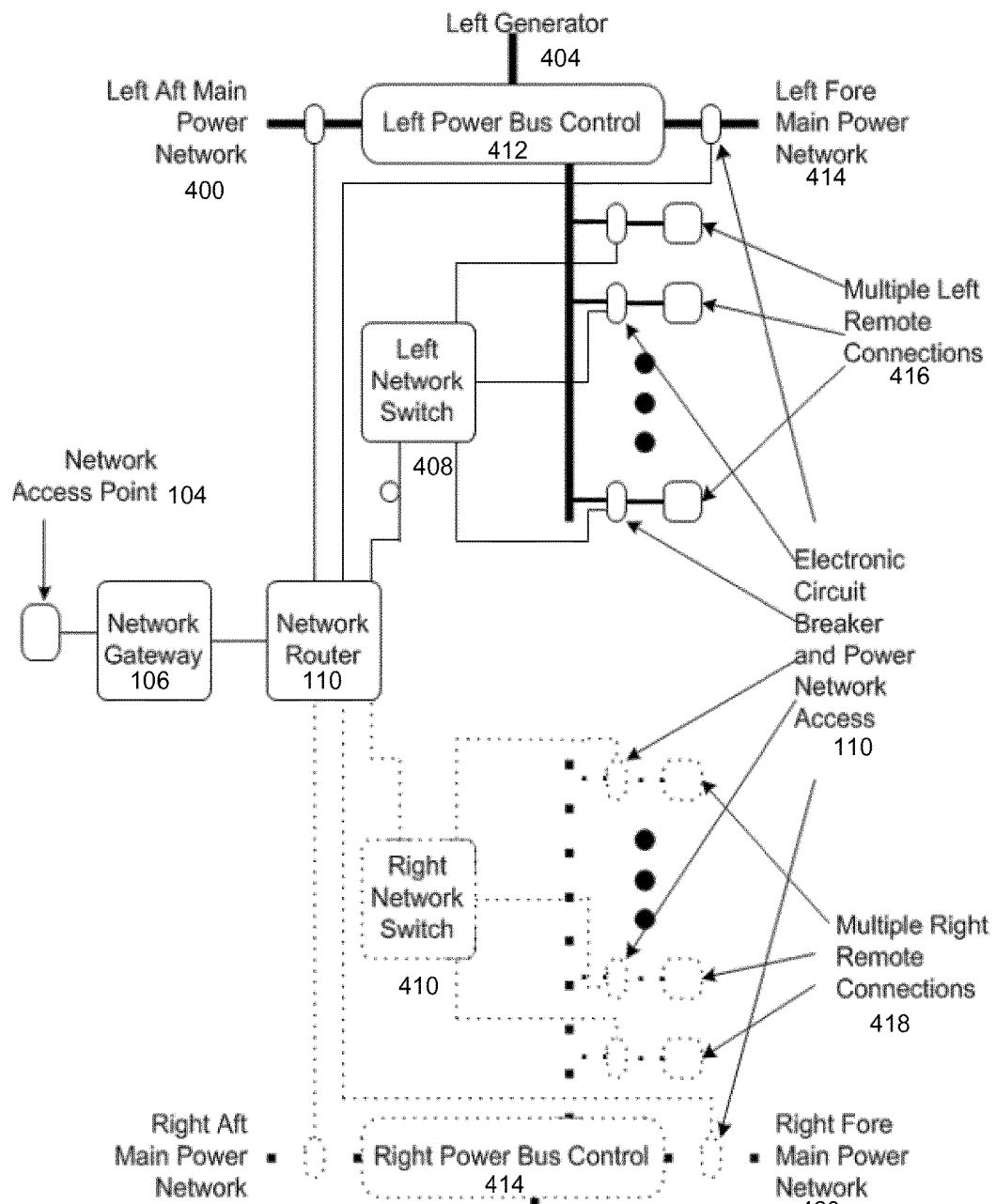
FIG. 4 shows a block diagram of an example embodiment of an aft electronic bay of a system for providing secured communications via an avionics power bus network in accordance with some embodiments of the inventive concepts disclosed herein.
Figure 5:
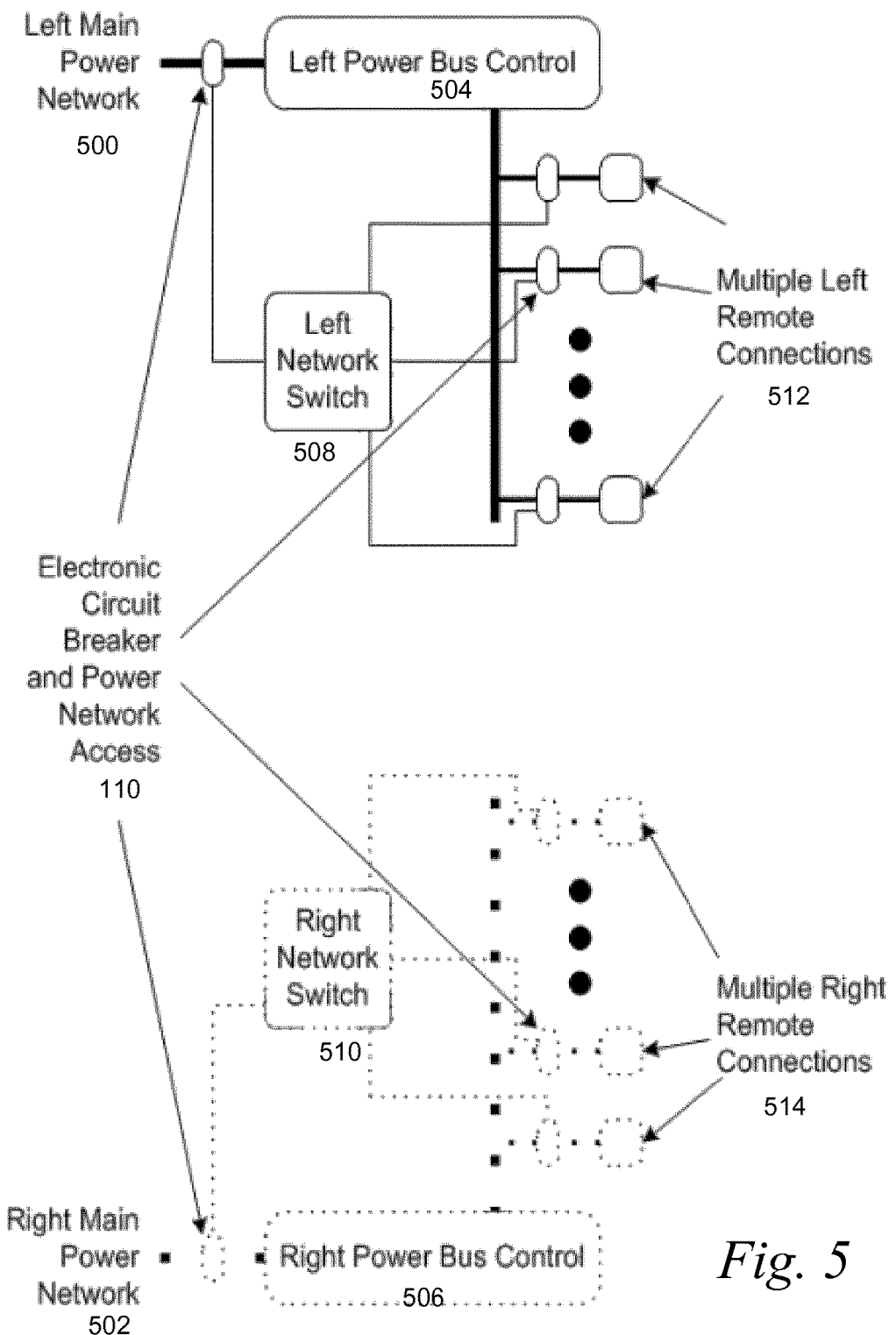
FIG. 5 shows a block diagram of an example embodiment of a fore electronic bay of a system for providing secured communications via an avionics power bus network in accordance with some embodiments of the inventive concepts disclosed herein.

In FIG. 4, the network router 110 and/or the network switches 408, 410 may each also include or correspond to an Electronic Circuit Breaker and Power Network Access components 110, or at least include some of the functionality of the component 110. The aft electronics bay 200 may include aft main power network(s) 400, 402, 414, 420, and power generator(s) 404, 414 to supply power to the aft main power network(s) and/or to multiple remote connections.

In FIG. 5, the fore (or forward) electronics bay 214 may include fore main power network(s) 500, 502. The network switches 508, 510 of the fore electronics bay 214 may each include or correspond to an Electronic Circuit Breaker and Power Network Access components 110, or at least include some of the functionality of the component 110.

Figure 6:
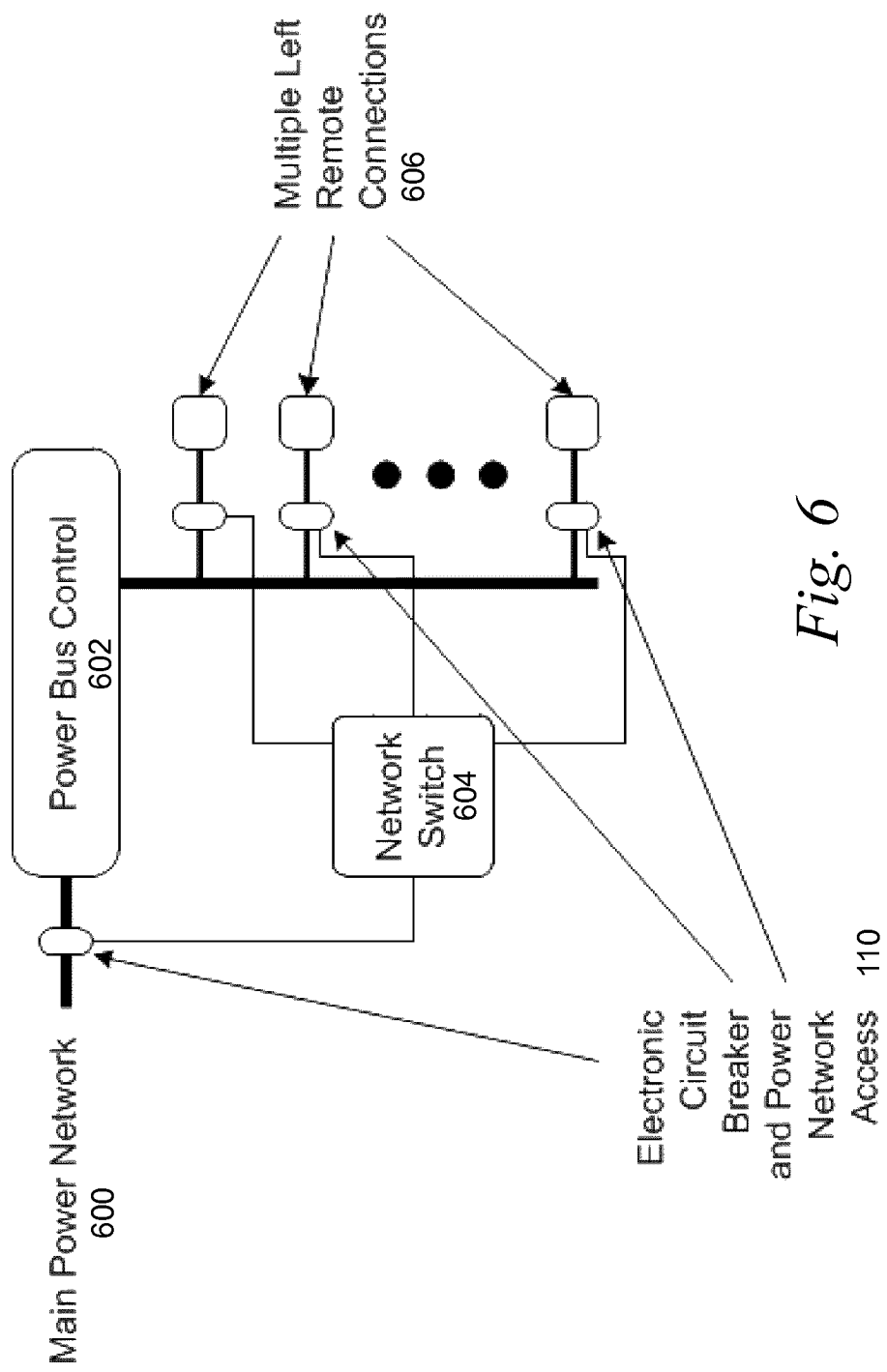
FIG. 6 shows a block diagram of an example embodiment of a remote power distribution portion of a system for providing secured communications via an avionics power bus network in accordance with some embodiments of the inventive concepts disclosed herein.

One embodiment of a remote power distribution portion of the power bus network 108 is illustrated in FIG. 6. The remote power distribution portion(s) (e.g., 202, 204, 210, or 212) of the power bus network 108 can provide remote power distribution to aircraft electronic equipment for instance. As a power network function, the remote power distribution portion can provide network switching functions (e.g., via the network switch 504 and/or Electronic Circuit Breaker and Power Network Access components 110) to communicate with downstream connections. The remote power distribution portion can support a mix of connections that are power network enabled or not, through functionality provided by the Electronic Circuit Breaker and Power Network Access components 110. The Remote Power Distribution may provide similar or equivalent functionality as the fore electronic bay 214, without the dual power inputs via the main power networks 500, 502.

In some embodiments, one or more endpoint devices 102 are connected to the power bus network 106 at corresponding remote connections (e.g., 220, 222). In certain embodiments, the remote connections are endpoints of the system or the power bus network 106. An endpoint device 102 can be providing a singular function and/or sensor input, or can be providing multiple functions and/or sensor inputs. In some cases, an endpoint device 102 can correspond to a complex aircraft subsystem, such as a display or flight controls system. Connections to endpoint devices can be enabled or configured through the power bus network 108 or may be isolated from the network 108 depending on system level need, via configuration using the network gateway 106.

In certain embodiments, an endpoint device 102 may operate as an intermediary device and extend the power bus network 106 (and corresponding communications network) to another endpoint device 102. For instance, a first endpoint device 102 may tap into the power bus network 106 and distribute power to a second endpoint device 102 (connected to the first endpoint device 102). The first endpoint device 102 may also communicate packets between the second endpoint device 102 and another portion of the power bus network 106.

Figure 7:
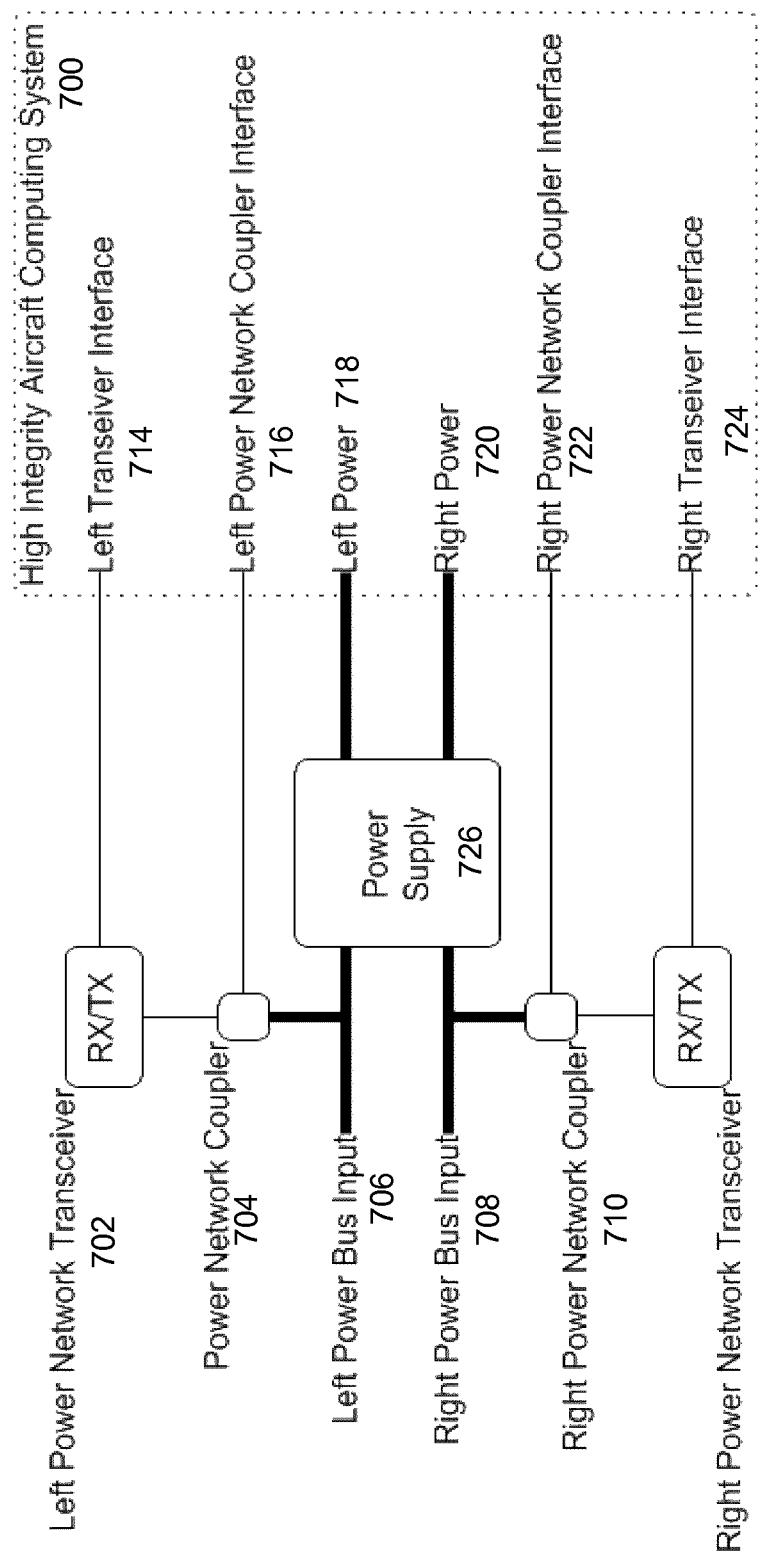
FIG. 7 shows a block diagram of an example embodiment of a high integrity subsystem of a system for providing secured communications via an avionics power bus network in accordance with some embodiments of the inventive concepts disclosed herein.
Figure 8:
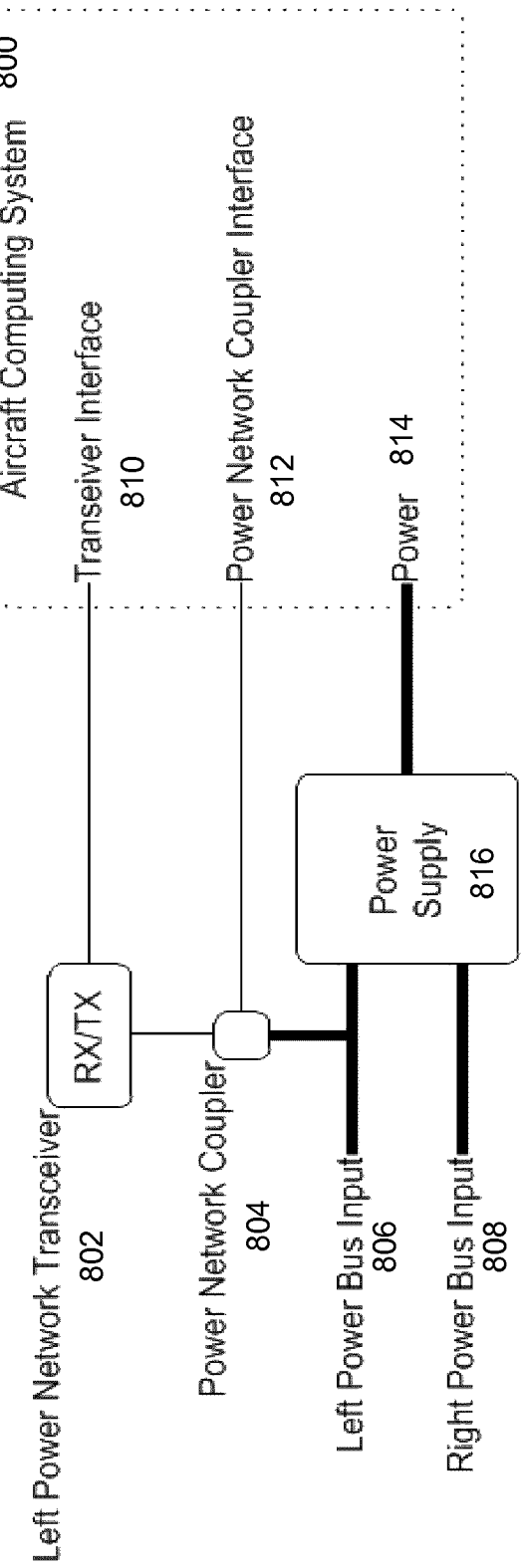
FIG. 8 shows a block diagram of an example embodiment of another subsystem of a system for providing secured communications via an avionics power bus network in accordance with some embodiments of the inventive concepts disclosed herein.

In some embodiments, an endpoint device 102 may include or correspond to a high integrity aircraft computing system 700. One example embodiment of a high integrity aircraft computing system 700 is depicted in FIG. 7. A high integrity aircraft computing system 700 may correspond to a critical system or device, that would benefit from having a redundant communication path. A high integrity aircraft computing system 700 may be connected to two available power bus networks 108, (e.g., of an aircraft) or to two power domains 112 of one power bus network 108. This is in contrast to an aircraft computing system that has access to one available power bus networks 108 or power domains 112, an example embodiment of which is depicted in FIG. 8. By allowing such a high integrity aircraft computing system or endpoint device 102 to have a dual redundant network, the high integrity aircraft computing system 700 is less likely to be subject to power supply and/or communications failure or disruption. The control and management aspects of network connections to the high integrity aircraft computing system 700 may be provided by the network gateway 106 for instance.

These aircraft computing systems are connected to the power bus network 108 via network access interfaces 110. The left portions of FIGS. 6 and 7 may depict features associated with the network access interfaces 110, such as power network couplers 704, 710, 804 and power network transceivers 702, 712, 802. The aircraft computing systems 700, 800 may interface to the power bus network via power input(s) 718, 720, 814. The aircraft computing systems 700, 800 may communicatively interface to the network access interfaces 110 of the power bus network via power network coupler interfaces(s) 716, 7202, 812 and/or transceiver interface(s) 714, 724, 810.

In accordance with the inventive concepts disclosed herein, the approach of using the power bus network 108 as described provide an alternate/redundant yet dissimilar communication approach over the existing aircraft infrastructure that can be leveraged for many communication functions. As a redundant interconnect, the power bus network 108 can be leveraged to remove or avoid other interconnects to further reduce wired interfaces. In an aircraft, such reduction in interconnects and/or wired interfaces can drive savings by reducing weight or load on an aircraft for instance. Moreover, certain power domains associated with critical or sensitive systems (e.g., on an aircraft) can be secured and protected against network access or traffic from endpoint devices (e.g., passenger cabin devices) that do not have the proper credentials or authorization.

Figure 9:
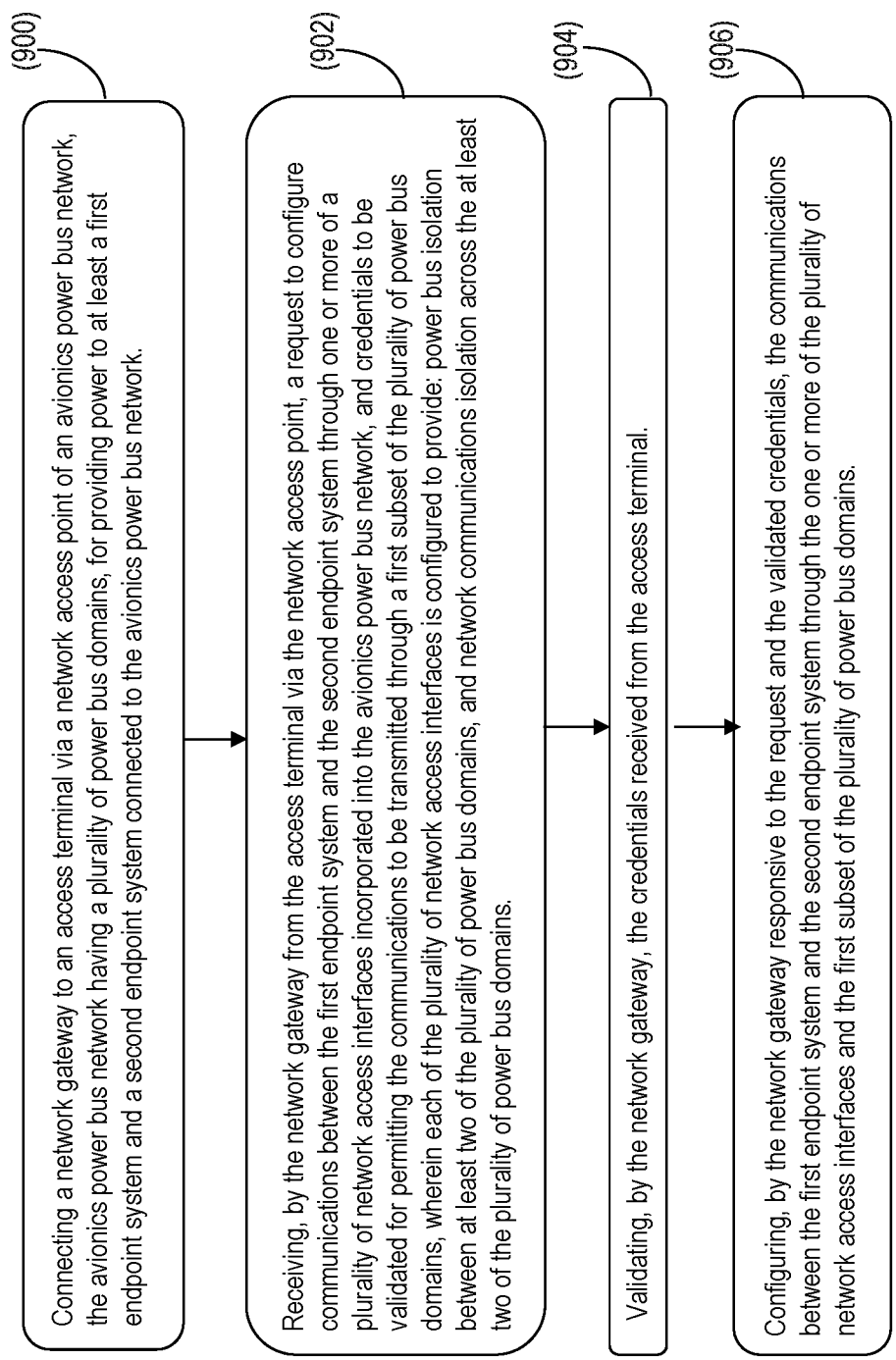
FIG. 9 shows a flow diagram of an example embodiment of a method for providing secured communications via an avionics power bus network in accordance with some embodiments of the inventive concepts disclosed herein.

Referring now to FIG. 9, one embodiment of a method for providing secured communications via a power bus network is depicted. The method includes connecting a network gateway to an access terminal via a network access point of an avionics power bus network (900). The avionics power bus network may have a plurality of power bus domains, for providing power to at least a first endpoint system and a second endpoint system connected to the avionics power bus network. The network gateway may receive, from the access terminal via the network access point, a request to configure communications between the first endpoint system and the second endpoint system through one or more of a plurality of network access interfaces incorporated into the avionics power bus network, and credentials to be validated for permitting the communications to be transmitted through a first subset of the plurality of power bus domains (902). Each of the plurality of network access interfaces may provide power bus isolation between at least two of the plurality of power bus domains, and network communications isolation across the at least two of the plurality of power bus domains. The network gateway may validate the credentials received from the access terminal (904). The network gateway may configure, responsive to the request and the validated credentials, the communications between the first endpoint system and the second endpoint system through the one or more of the plurality of network access interfaces and the first subset of the plurality of power bus domains (906).

Referring now to step 900, and in some embodiments, an access terminal is connected to a network gateway via a network access point of an avionics power bus network. The avionics power bus network may have a plurality of power bus domains, for providing power to at least a first endpoint system and a second endpoint system connected to the avionics power bus network. A user of the access terminal or device 100, such as an administrator or technician, may access the network gateway to configure communications between the first endpoint system and a second endpoint system. The access terminal 100 may connect to the network gateway 106 via a physical or wireless interface at the network access point 104, using any type of connection or communications protocol, for example and not limited to those based on Ethernet, Wi-Fi, and/or Cellular. The network access point 104 may translate one or more messages or instructions from the access device 100, to a form or a communications protocol (e.g., IEEE 802.3, or ARINC 664) supported by the power bus network 108 and/or the network gateway 106. The network access point 104 may provide the access device 100 access to the network gateway 106. In some embodiments, the network access point 104 may authenticate an access device 100 connecting to the network access point 104 or sending a message through the network access point 104.

Referring now to step 902, and in some embodiments, the network gateway may receive, from the access terminal via the network access point, a request to configure communications between the first endpoint system and the second endpoint system through one or more of a plurality of network access interfaces incorporated into the avionics power bus network. The network gateway may receive, from the access terminal via the network access point, credentials to be validated for permitting the communications to be transmitted through a first subset of the plurality of power bus domains. In some embodiments, the network gateway 106 provides a gateway or interface to access the power bus network 106 and/or access information about the power bus network 106. The network gateway 106 may provide authentication services to validate credentials provided by the access device 100 from the network access point 104, and determine whether to deny or grant access to the power bus network 106. The user may use the access device 100 to access the network gateway 106 to configure one or more communication paths between the two endpoint devices 102 using the power bus network 108.

The network gateway 106 may receive from the access device 100 a request or instruction to configure communications between two endpoint devices 102. The access device 100 may provide credentials and information to the network gateway 106 to authenticate the access device 100, and/or to authenticate the end point device(s) 102 for communications using the power bus network 108. The credentials and information may include any type or form of login information, certificate, encryption key information, biometrics, password/passcode, captcha response, addresses (e.g., device IP addresses associated with the endpoint devices), identification (e.g., user name/ID, MAC address, device identifier associated with the user and/or endpoint devices), for example.

2) In some embodiments, the access terminal includes or corresponds to the first endpoint system, and the credentials are provided by the first endpoint system to the network gateway via the network access point. The network access point may be connected to the first endpoint system (e.g., the access terminal 100), and the credentials are provided by the first endpoint system to the network gateway via the network access point. In such cases, the access terminal may be requesting the network gateway for access to data or functionality of another endpoint device using the power bus network.

Each of the plurality of network access interfaces may provide power bus isolation between at least two of the plurality of power bus domains, and/or network communications isolation across the at least two of the plurality of power bus domains. Some of the network access interfaces each includes a switch or router for network communications, and may provide network communications isolation through switching and/or routing functionality. Some of the network access interfaces may provide a network translation layer between at least two power bus domains.

The network access interfaces 110 of the power bus network 108 may include a network router. The network router may provide a network translation layer between different network domains of the aircraft for instance. These network domains can be between switches or other systems. For example, a network access interface, such as a network router, may translate between one or more of: different voltages, current levels, communications protocols and/or frequencies, packet sizes, data rates, packet priority levels, network stack layers for packet processing and/or transmission, etc. The network router may be configured and/or administered through the network gateway 106.

In some embodiments, a network access interface 110 can provide an interface connection with some portion of the power bus network 108 (e.g., one or more power domains) in order to leverage the connection to achieve communication with other systems connected to the power bus network 108. The network access interfaces may include circuit breaker circuitry configured to provide physical isolation or physical connection between two corresponding power bus domains according to the provided credentials. The network access interfaces may execute a transactions program to allow or deny a communication to pass through to specific power domain(s) according to the provided credentials. Different sets of power bus domains may require different sets of credentials for access by endpoint devices to communicate packets or perform network transactions.

Referring now to step 904, and in some embodiments, the network gateway may validate the credentials received from the access terminal. For instance, the network gateway may validate the credentials of each endpoint device and/or the access terminal. The network gateway may validate the credentials in accordance with specific communications or transaction requests. The network gateway may validate any provided device certificates, passwords, biometrics, etc., and may validate the credentials by applying one or more rules or policies of a policy engine, and/or by accessing an authentication server that provides authentication services.

The network gateway 106 may provide a network management function to allow for configuration of various network switches and/or routers, etc. The network gateway 106 may determine whether the end point devices 102 are authorized to communicate with each other, and/or authorized to access one or more power domains 112 of the power bus network 108, based on validated credentials. The network gateway 106 may determine power domains 112 that a particular transaction of the endpoint devices is authorized to use for communications.

The network gateway 106 may determine locations or remote connections where the endpoint devices connect to the power bus network 108, and may determine if a communication path is possible between these locations according to the power domains that the endpoint devices (or corresponding transactions) are authorized to access. The network gateway 106 may determine or identify one or more authorized communications paths via the power bus network 108, for the endpoint devices (or for the corresponding transactions), according to the validated credentials. In some cases, the network gateway 106 is not able to validate the credentials, and may deny access by the endpoint devices to communicate via the power bus network 108.

Referring now to step 906, and in some embodiments, the network gateway 106 may configure, responsive to the request and the validated credentials, the communications between the first endpoint system and the second endpoint system through one or more of the plurality of network access interfaces and a subset of the plurality of power bus domains. The network gateway 106 may configure, according to the validated credentials, at least a subset of the network access interfaces to each allow or deny, via a transactions program executing on the respective network access interface, a communication to pass. The network gateway 106 may configure, according to the validated credentials, at least a subset of the network access interfaces to each provide physical isolation or physical connection via a circuit breaker between two corresponding power bus domains.

In some embodiments, the network gateway 106 receives a second request via the network access point from the access terminal, to configure communications between a third endpoint system and a fourth endpoint system through the avionics power bus network. The network gateway 106 may receive corresponding credentials to be validated for permitting the communications to be transmitted through a second subset of the plurality of power bus domains. In accordance with the inventive concepts described herein, the network gateway 106 may determine a different communication path for the communications without undermining the security or isolation of particular power domains, responsive to validating the corresponding credentials.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The present disclosure contemplates methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. A system for providing secured communications via an avionics power bus network, the system comprising:
   an avionics power bus network having a plurality of power bus domains for providing power to at least a first endpoint system and a second endpoint system, and a plurality of network access interfaces configured to provide power bus isolation between at least two of the power bus domains, and control network communications isolation across the at least two of the power bus domains;
   a network gateway for configuring the one or more of the network access interfaces to permit communications between the first endpoint system and the second endpoint system across the at least two power bus domains, and for validating first credentials to permit the communications to be transmitted across the at least two power bus domains; and
   a network access point connection for accessing the network gateway to configure the communications across the at least two power bus domains, and to provide the first credentials to the network gateway, wherein the plurality of power bus domains includes a subset of power bus domains that is accessed via second credentials different from the first credentials.

2. The system of claim 1, wherein the network access point connection is connected to the first endpoint system and the first credentials are provided by the first endpoint system to the network gateway via the network access point connection.

3. The system of claim 1, wherein the network access point connection is connected to an access terminal and the first credentials are provided by the access terminal to the network gateway via the network access point connection.

4. The system of claim 1, wherein at least a subset of the network access interfaces each executes a transactions program, the transactions program configured to allow or deny a communication to pass through corresponding network access interfaces according to the first credentials.

5. The system of claim 1, wherein at least a subset of the network access interfaces each includes a circuit breaker configured to provide physical isolation or physical connection between two corresponding power bus domains according to the first credentials.

6. The system of claim 1, wherein at least a subset of the network access interfaces each comprises a switch or router for network communications.

7. The system of claim 1, wherein at least a subset of the network access interfaces are each configured to provide a network translation layer between a respective at least two power bus domains.

8. A method for providing secured communications via an avionics power bus network, the method comprising:
   connecting a network gateway to an access terminal via a network access point connection of an avionics power bus network, the avionics power bus network having a plurality of power bus domains for providing power to at least a first endpoint system and a second endpoint system connected to the avionics power bus network;
   receiving, by the network gateway from the access terminal via the network access point connection, a request to configure one or more of a plurality of network access interfaces incorporated into the avionics power bus network, to permit communications between the first endpoint system and the second endpoint system across at least two power bus domains, and first credentials to be validated for permitting the communications to be transmitted across the at least two power bus domains, wherein each of the plurality of network access interfaces is configured to control:
      provide power bus isolation between the at least two power bus domains, and
      control network communications isolation across the at least two of the plurality of power bus domains;
   validating, by the network gateway, the first credentials received from the access terminal; and
   configuring, by the network gateway responsive to the request and the validated first credentials, the communications between the first endpoint system and the second endpoint system across the at least two power bus domains through the one or more of the plurality of network access interfaces, wherein the plurality of power bus domains includes a subset of power bus domains that is accessed via second credentials different from the first credentials.

9. The method of claim 8, wherein the access terminal comprises the first endpoint system and the first credentials are provided by the first endpoint system to the network gateway via the network access point connection.

10. The method of claim 8, further comprising receiving, by the network gateway from the access terminal via the network access point connection, a second request to configure communications between a third endpoint system and a fourth endpoint system through the avionics power bus network, and the second credentials to be validated for permitting the communications between the third endpoint system and the fourth endpoint system to be transmitted through the subset of the plurality of power bus domains.

11. The method of claim 8, further comprising configuring, by the network gateway according to the first credentials, at least a subset of the network access interfaces to each allow or deny, via a transactions program executing on the respective network access interface, a communication to pass.

12. The method of claim 8, further comprising configuring, by the network gateway according to the first credentials, at least a subset of the network access interfaces to each provide physical isolation or physical connection via a circuit breaker between two corresponding power bus domains.

13. The method of claim 8, wherein at least a subset of the network access interfaces each comprises a switch or router for network communications.

14. The method of claim 8, further comprising providing, by each of at least a subset of the network access interfaces, a network translation layer between a respective at least two power bus domains.

15. An avionics power bus network for secured communications, the avionics power bus network comprising:
a plurality of power bus domains for providing power to at least a first endpoint system and a second endpoint system;
a plurality of network access interfaces each configured to provide power bus isolation between at least two of the power bus domains, and to control network communications isolation across the at least two power bus domains;
a network gateway for configuring one or more of the network access interfaces to permit communications between the first endpoint system and the second endpoint system across the at least two power bus domains, and for validating first credentials to permit the communications to be transmitted across the at least two power bus domains; and
a network access point connection for accessing the network gateway to configure the communications across the at least two power bus domains, and to provide the first credentials to the network gateway, wherein the plurality of power bus domains includes a subset of power bus domains that is accessed via second credentials different from the first credentials.

16. The avionics power bus network of claim 15, wherein the network access point connection is connected to the first endpoint system and the first credentials are provided by the first endpoint system to the network gateway via the network access point connection, or the network access point connection is connected to an access terminal and the first credentials are provided by the access terminal to the network gateway via the network access point connection.

17. The avionics power bus network of claim 15, wherein at least a subset of the network access interfaces each executes a transactions program, the transactions program configured to allow or deny a communication to pass through corresponding network access interfaces according to the first credentials.

18. The avionics power bus network of claim 15, wherein at least a subset of the network access interfaces each includes a circuit breaker configured to provide physical isolation or physical connection between two corresponding power bus domains according to the first credentials.

* * * * *